United States Patent Office 3,459,849
Patented Aug. 5, 1969

3,459,849
METHOD FOR THE MANUFACTURE OF A TIRE
Willem de Ronde, Heer, Netherlands, assignor to N.V. Rubberfabriek Vredestein, The Hague, Netherlands, a corporation of the Netherlands
Filed Jan. 12, 1967, Ser. No. 608,819
Claims priority, application Netherlands, Jan. 17, 1966, 6600590
Int. Cl. B29h 5/02, 17/06; B29f 1/10
U.S. Cl. 264—255         4 Claims

ABSTRACT OF THE DISCLOSURE

A method for the manufacture of a tire in a two-piece mould with the aid of a bladder. A form retaining core consisting of a number of segments is introduced into the bladder while it is in place within the pre-shaped tire carcass and the shaping of the carcass is completed by closing the mould over the bladder and subsequently injecting the outer covering of the tire into the mould under pressure. The carcass and covering are then cured and the mould is opened to remove the tire.

---

This invention relates to a method for the manufacture of a tire in a mould consisting of at least two parts.

The invention aims at providing a method and a device for the manufacture of tires by means of which said tire may be manufactured inexpensively and rapidly in one operation.

This is accomplished with the method according to the invention in that the carcass of the tire is preshaped with the aid of a bladder, subsequently a form-retaining core consisting of a number of segments is introduced into the bladder situated within the preshaped carcass and the shaping of the carcass is completed during the closing of the mould, after which the outer covering of the tire is injected into the mould under pressure, die cast or applied in a similar way and the carcass is cured or hardened.

It is already known to utilize a bladder for the manufacture of tires. Usually such a bladder is closed at one end by a top plate whereas its other end communicates or is adapted to be brought in communication with a space containing a pressurised fluid. In its stretched condition the bladder has a substantially cylindrical shape and it is manufactured from such material, for example rubber or canvas covered with rubber, that during the closing of the mould it may be given a substantially toroidal shape in accordance with the interior shape of a tire.

It is also known to manufacture tires with the aid of a core consisting of a number of segments and introduced in the carcass.

The invention consists in particular in the application of a bladder and of a core consisting of a number of segments which permits the outer covering which forms the tread, the sides and the bead of the tire to be injected, die cast or applied in a similar way under pressure. The application of this combination of a bladder and core has the advantage that the pressure required for introducing the covering material of the carcass may be high (500–2000 atmospheres) without the interior pressure in the bladder having too great a magnitude and without said high exterior (injection) pressure leading to an undesired deformation of the carcass. The application of a bladder also offers the advantage that carcasses, which prior to the shaping have a substantially cylindrical shape, need not be shaped in a separate apparatus, therefore not in a separate stage of operation. Introduction of the core into the bladder assists in correctly shaping the carcass. As the bladder covers the joints between the core segments which support said bladder and the covering material is introduced in the mould under high pressure, the inner and outer profile of the covering will always exactly correspond to the profile of the mould.

A preferred embodiment of the method according to the invention is characterized in that after the curing or hardening of the outer covering of the carcass a fluid, for example air, is supplied again under pressure to the bladder until said bladder has spread the beads of the tire so far that the core segments may be easily withdrawn from the manufactured tire. It is preferred during said spreading or after said spreading to move all core segments simultaneously away from the lower mould part so that they lift the tire portion located in the lower mould part out of said mould.

The device for performing this method comprises a chamber in which there is located a core consisting of a number of core segments, a mechanism for introducing said core segments into a mould and removing them from said mould, and a locking device for said core segments, said chamber being at least provided with conduits for supplying a pressurised fluid to said chamber and if desired for partly evacuating said chamber, the chamber being sealingly connected with the lower portion of a bladder of which the upper end is closed, means being provided for opening and closing the mould and for stretching the bladder. The device may be provided with a press.

The chamber of the device may have a sliding connection at its upper end with the lower platen of the press, the lower part of the mould being detachably mounted on said lower platen, the core segments being detachably connected to their operating mechanism.

During the operation of this method the mechanism for introducing the core segments into the bladder and for removing said core segments from said bladder may consist of a number of horizontal cylinders the piston rods of which move the core segments in a horizontal direction and of a number of vertical cylinders the piston rods of which move the core segments in a vertical direction. The core segments may be fixedly or detachably connected to the vertical piston rods.

Other features of the method of this invention will be further explained below with reference to the accompanying drawings showing by way of example an embodiment of the device according to the invention.

Figure 1:
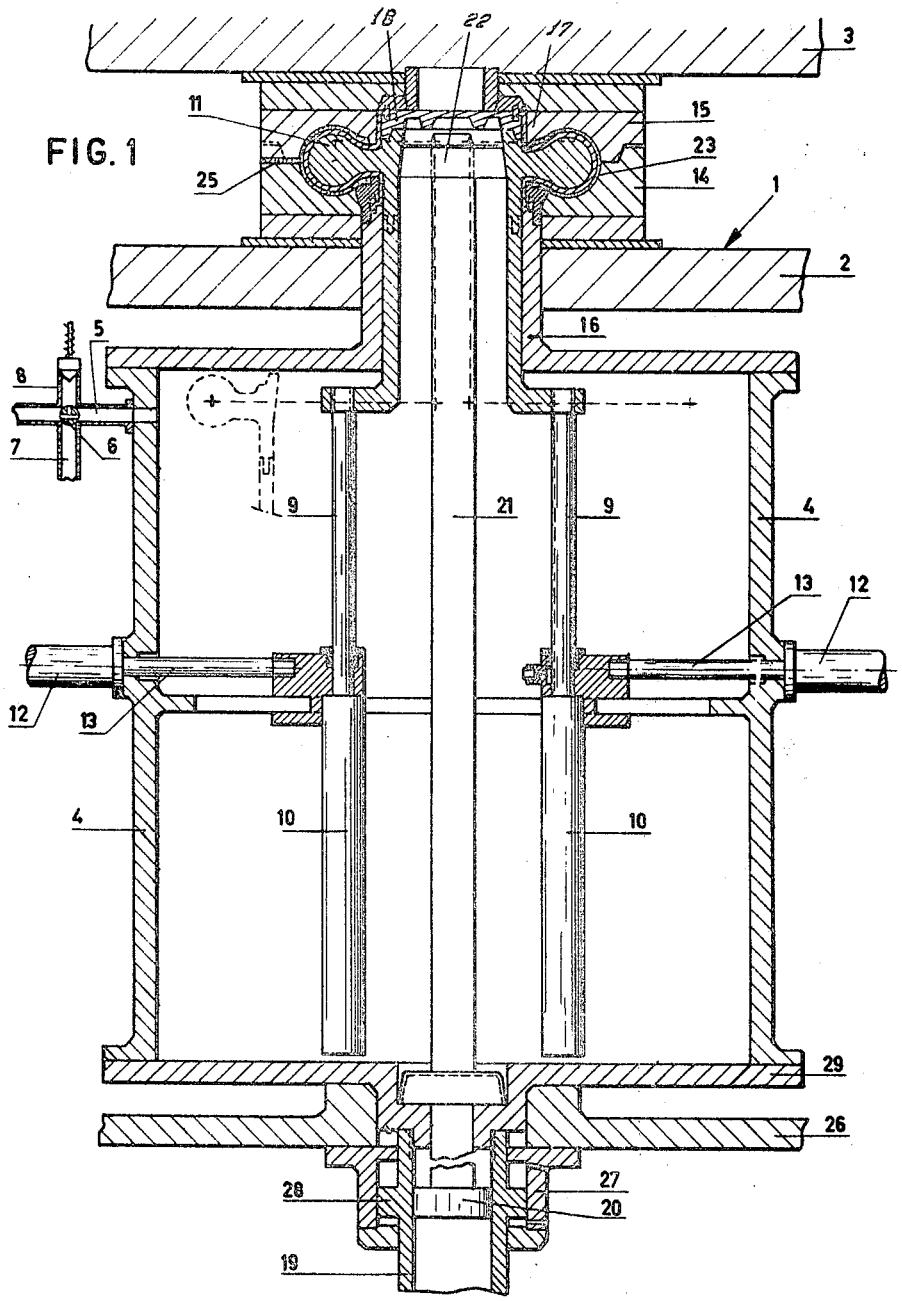
FIG. 1 shows diagrammatically a device according to the invention in the position in which the coating-material is introduced into the mould with press-platens for opening and closing the mould.

FIG. 1 shows of a press 1 of known construction only those parts which are necessary for understanding the invention. Said press comprises a lower platen 2 and an upper platen 3 which is adapted to be moved away from the lower platen and toward the lower platen. Below the press there is arranged a chamber 4 provided with a supply conduit 5 for supplying a pressurized fluid, for example air, to said chamber. In this conduit there is provided a valve 6, said valve being adapted to connect the conduit with a source (not shown) for supplying pressurized fluid or with a vacuum line 7. In addition there is provided a pressure relief valve 8.

In the chamber a number of vertical cylinders 10 are provided, the piston rods 9 of which serve to move the core segments 11 upwards and downwards. At the outside of the chamber 4 there are provided horizontal cylinders 12 the piston rods 13 of which may move the core segments 11 such that these are brought into a bipartite mould 14, 15 or are removed from said mould and may move each segment into its appropriate storage position within the chamber.

The chamber 4 comprises at its upper end a cylindrical part 16 to which the lower platen 2 of the press is slidingly connected. The lower end of the bladder 17 is sealingly secured to said cylindrical part. The upper end of said bladder 17 is likewise sealingly connected to an upper plate 18.

The device is furthermore provided with a cylinder 19 with a piston 20. This piston is provided with a rod 21 which at its upper end has a conical plate 22 serving as a locking members for the core segments. This piston 20 and the rod 21 serve to bring the bladder 17 into its stretched condition (see FIG. 3) in which this bladder has a substantially cylindrical shape. In this condition a manufactured tire 23 is removed from the device and a not yet shaped carcass 24 is introduced into the device.

Figure 2:
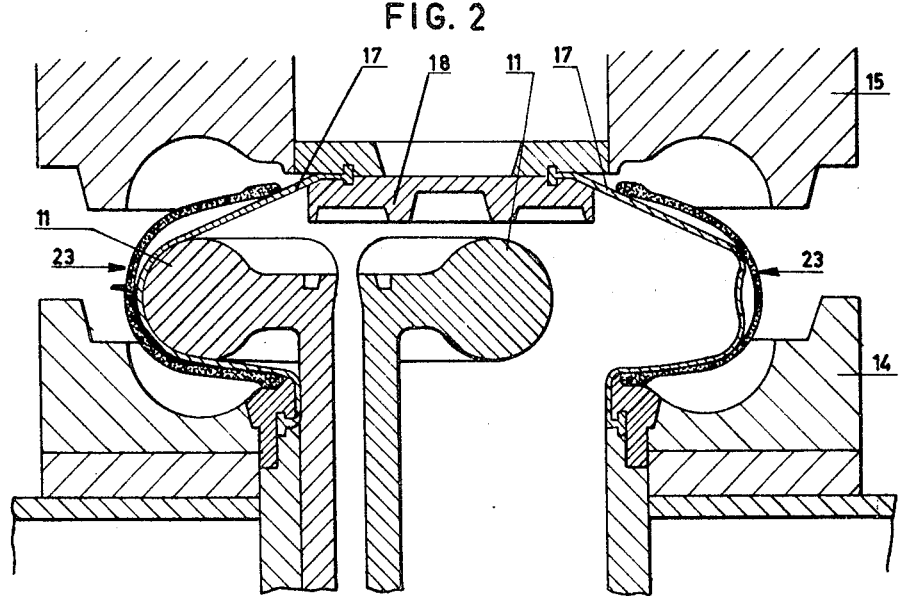
FIG. 2 shows diagrammatically on the right a core segment during its extraction from the manufactured tire and on the left a core segment still in position in said tire.

In light of the above-described device the method of this invention is as follows:

Starting from the position of the device shown in FIG. 1 with the manufactured tire 23 as shown, the press is opened a small distance, so that consequently the upper part 15 of the mould 14, 15 is moved upwards a small distance. Thereafter pressurised fluid is introduced into the vertical cylinders so that the piston rods 9 of the vertical cylinders 10 move all the core segments 11 simultaneously upwards until the piston rods have effected their complete stroke. As a result thereof the lower half of the manufactured tire is withdrawn from the lower part 14 of the mould 14, 15. At the upward movement of the press the upper half of the tire has already been withdrawn from the upper part 15 of the mould 14, 15. Such a quantity of pressurised fluid is supplied to the chamber 4 that a predetermined pressure prevails therein. The pressure in the chamber 4 ensures that the upper plate 18 follows the upper part of the mould in its upward movement. As a consequence thereof the bladder 17 assumes the position shown in FIG. 2 and in this position the core segments 11 are withdrawn by the piston rods 9 of the vertical cylinders 10, which are moved by the piston rods 13 from the manufactured tire 23 and subsequently are moved downwards whereupon they are brought into the chamber 4. The piston rods 13 of the horizontal cylinders 12 ensure that the core segments get into their appropriate storage position within the chamber 4.

Figure 3:
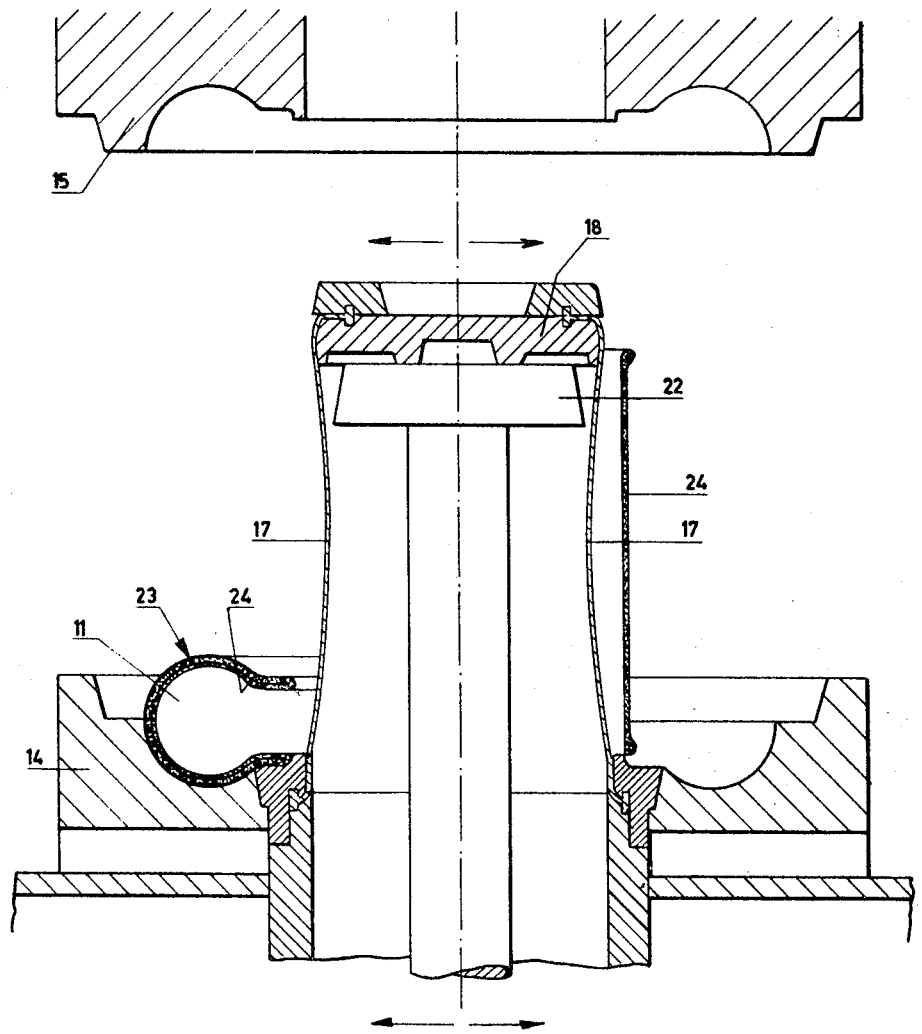
FIG. 3 shows diagrammatically on the left, part of the device with a tire manufactured therein and on the right, part of the device in which the carcass to be shaped is arranged around the bladder.

When all the core segments 11 are removed from the manufactured tire, the upper plate 18 is moved further upwards by the rod 21 and the plate 22, while the press is open or being opened, until the bladded 17 has assumed its position shown in FIG. 3. As shown on the left of FIG. 3 the manufactured tire has dropped back into the lower part 14 of the mould, but said tire is lying loose in said lower part so that it may be easily removed from the device.

If desired the pressurised air may be removed from the chamber 4 prior to or during the continued upward movement of the upper plate 18 and said chamber may be evacuated so that consequently the bladder may be easily and rapidly brought into its stretched position. In the position of the bladder shown in FIG. 3 a carcass 24 is slipped on the bladder 17, said carcass being manufactured in any known way. Thereafter air is admitted to the chamber 4 until a suitable pressure (0.9–3.0 atmospheres) prevails in said chamber, and therefore also in the bladder 17. The magnitude of this pressure depends on the ply rating of the tire. As a result of this pressure the bladder expands so that its outer surface makes intimate contact with the inner surface of the carcass. Subsequently the upper platen 3 of the press is moved downwards so that the upper part 15 of the mould 14, 15 comes into contact with the upper plate 18 of the bladder 17 and said plate is given its correct position relative to said upper part of the mould by a conical locating arrangement. During this downward movement of the upper plate 18 the latter pushes the plate 22 and hence the piston rod 21 downwards.

Figure 4:
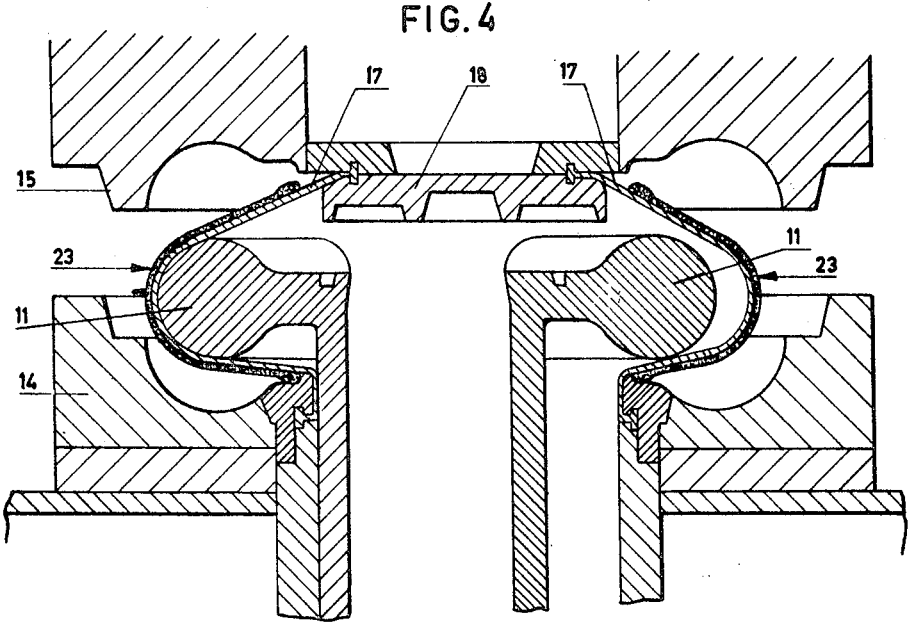
FIG. 4 shows diagrammatically on the left, part of the device with raised core segments and on the right, part of the device with a core segment partly removed from the manufactured tire.

The downward movement of the upper plate 18 and the upper part 15 of the mould is carried out until they assume the position shown in FIG. 4. Thereupon the plate 22 is brought into its entirely withdrawn position down in the lower part of the chamber 4 to permit the core segments to be moved. With this position of the plate 22 the bladder 17, which has assumed the shape shown in FIG. 4, will maintain said shape on account of the pressure prevailing therein and of the rigidity of the material from which said bladder is manufactured.

In the position shown in FIG. 4 the bladder 17 has pre-shaped the carcass 24. The beads of the carcass 24, however, are still located at such a distance from each other that the core segments may still be easily brought into the bladder 17 which is done in the reversed manner to that described above for withdrawing said core segments.

After all core segments 11 have been introduced into the bladder 17 the conical plate 22 is moved upwards so that the core segments 11 are located. Thereafter the upper part 15 of the mould is moved downwards, pushing the core segments 11 downwards until they are positioned within the closed mould. If desired the pressure in the cylinder 19 may thereafter be increased. The ends of the core segments 11 are slightly chamfered in accordance with the conical plate 22. As a result of this slight chamfering the force exerted on the core segments 11 will have only a small component on the core segments in the vertical direction.

When the plate 22 has been moved upyards, the components of the device have assumed the position shown in FIG. 1, in which the carcass 24 is shaped and the core segments 11 are clamped between the conical plate 22 and the upper plate 18, the upper part of the bladder 17 is clamped between the core segements 11 and the upper part 15 of the mould 14, 15 and the lower part of the bladder 17 between the lower part 14 of the mould 14, 15 and the projections of the core segments 11. Thereafter the covering material, for example a rubber compound, may be injected by means of a nozzle (not shown) through one or more conduits 25 into the space between the carcass 24 and the mould parts 14 and 15, whereupon said covering material is cured or hardenend. After curing the tire is ready and is removed from the device in the above-described manner.

For the curing process the core segments 11 and the mould parts are heated. Heating the core segments is preferably done electrically whereas it is preferred to heat the mould portions with steam. Care should be taken that all core segments have the same temperature. The mould 14, 15 may also be removably arranged in the press 1. For this purpose the lower part 14 of said mould must be releasably connected to the cylindrical portion of the chamber 4 and each core segment 11 must also be releasably connected with the operating mechanism, for example by a pin and hole connection as shown in dotted lines in FIG. 1. This entails the advantage that the mould with the bladder and the carcass, the injected covering and the core segments arranged in the bladder may be placed in a separate curing device. Instead of being integral with the press the chamber 4 may also be constructed as a separate unit. This entails the advantage that shaping the carcass and introducing the core segments into the bladder may be done outside of the press. After assembling the mould with the bladder and the carcass located therein and the core segments arranged in the bladder, the mould may be placed in a press in order to inject the covering material and to cure the covering material with the carcass. If desired only the injection may be carried out when the mould is in the press, whereas the curing may be effected in a device suitable for this purpose. In order to detach a manufactured tire from the lower part 14 of the mould it is also possible to move the chamber 4 with the components contained therein upwards over a small distance, for example 5 cm. For this purpose there is provided on the base plate 26 of the device a cylinder 27 in which a piston 28 is movably arranged, which is connected with the bottom 29 of the chamber 4. The core segments 11 may be introduced into and removed from the bladder 17 instead of pneumatically also in an hydraulic, electric, mechanical or in some other suitable way. Modifications of the operating mechanism, including supply of pressure, vacuum, steam etc. may be effected without departing from the scope and spirit of the invention. Introducing a carcass 24 into the device, removing the manufactured tire and introducing and removing the core segments 11 may be effected both automatically and by hand. Instead of a bladder which at its upper end is closed with an upper plate 18 it is possible to use a bladder the top of which is closed by an end which is integral with the walls of the bladder 17.

I claim:

1. A method for the manufacture of a tire in a mould having at least one upper and one lower part, said tire having an annular body comprising a carcass provided with an outer covering, said body terminating in spaced apart bead portions and providing in the completed tire an interior space, which method comprises preshaping the carcass with the aid of a bladder, subsequently introducing a form-retaining core consisting of a number of segments into said bladder which is situated within the preshaped carcass, closing the mould, the shaping of said carcass being completed during the closing of the mould, after which the outer covering of the tire is injected into the mould under pressure, the carcass with the outer covering material is cured, whereafter the mould is opened and the core segments and the bladder are removed from the manufactured tire.

2. A method for the manufacture of a tire in a mould, having at least one upper and one lower part, said tire having an annular body comprising a carcass provided with an outer covering, said body terminating in spaced apart bead portions and providing in the completed tire an interior space, which method comprises preshaping the carcass with the aid of a bladder, subsequently introducing a form-retaining core consisting of a number of segments into said bladder which is situated within the preshaped carcass, closing the mould, the shaping of said carcass being completed during the closing of the mould, after which the outer covering of the tire is injected into the mould under pressure, the carcass with the outer covering material is cured, after the curing of the carcass and the outer covering material the upper mould part is lifted and a pressurized fluid is supplied to the bladder until said bladder has spread the beads of the manufactured tire so far apart that the core segments may be removed from the manufactured tire, whereafter said core segments are removed from the bladder and said bladder is stretched so that the manufactured tire may be removed from the device.

3. A method according to claim 2, characterized in that all core segments are simultaneously lifted.

4. A method for the manufacture of a tire in a mould having at least one upper and one lower part, said tire having an annular body comprising a carcass provided with an outer covering, said body terminating in spaced apart bead portions and providing in the completed tire an interior space, which method comprises preshaping the carcass with the aid of a bladder, subsequently introducing a form-retaining core consisting of a number of segments into said bladder which is situated within the preshaped carcass, introducing the core segments after the preshaping of the carcass, into the bladder above the lower mould part whereupon all core segments are simultaneously moved to their definite place in the lower mould part, the mould is closed and the core segments are locked in place, whereafter the outer covering material of the tire is injected into the mould under pressure, the carcass with the outer covering material is cured, the mould is opened, the core segments and the bladder are removed from the manufactured tire and the manufactured tire is removed from the device.

References Cited

UNITED STATES PATENTS

| | | | |
|---|---|---|---|
| 1,289,774 | 12/1918 | Hopkinson | 18—17 |
| 2,476,884 | 7/1949 | Maynard | 264—326 X |
| 2,561,573 | 7/1951 | Hovlid et al. | |
| 2,569,935 | 10/1951 | Legvillon et al. | 264—328 X |
| 2,614,056 | 10/1952 | Kraft. | |
| 2,724,425 | 11/1955 | Ostling | 264—328 X |
| 2,744,290 | 5/1956 | Corson | 264—326 X |
| 2,873,790 | 2/1959 | Cadwell et al. | 264—328 X |
| 2,896,260 | 7/1959 | MacMillan. | |

FOREIGN PATENTS 1,034,336  6/1966  Great Britain.

ROBERT F. WHITE, Primary Examiner

N. RUSHEFSKY, Assistant Examiner

U.S. Cl. X.R.

18—17, 42; 264—275, 315, 328, 334